United States Patent Office 3,376,342
Patented Apr. 2, 1968

3,376,342
PROCESS FOR THE PREPARATION OF OXIME CARBAMATES
Bernard Loev, Broomall, Pa., assignor to Smith Kline & French Laboratories, Philadelphia, Pa., a corporation of Pennsylvania
No Drawing. Continuation-in-part of application Ser. No. 285,594, June 5, 1963. This application Aug. 24, 1966, Ser. No. 574,812
3 Claims. (Cl. 260—566)

ABSTRACT OF THE DISCLOSURE

Process of preparing oxime carbamates by reacting an oxime with an excess of an alkali metal cyanate and an excess of trifluoroacetic acid in a non-aqueous medium at about 15–50° C. Stereoisomeric oximes are stereospecifically converted to the oxime carbamates by this process.

---

This application is a continuation-in-part of Ser. No. 285,594 filed June 5, 1963 and now abandoned.

This invention relates to a new and useful process for the prepartion of oxime carbamates.

Prior art methods of preparing carbamates by reacting an hydroxy compound with an alkali metal cyanate and a mineral acid are not satisfactory for the preparation of oxime carbamates because of the sensitivity of oximes to mineral acid. The process of this invention is advantageous in that mineral acid is not used and it is carried out in a non-aqueous medium under mild reaction conditions and it is therefore of general applicability in the preparation of oxime carbamates.

According to another aspect of this invention, stereoisomeric oximes are stereospecifically converted to the oxime carbamates. Thus, by the process of this invention a syn or anti oxime is converted to the corresponding syn or anti oxime carbamate.

The process of this invention provides an advantageous method for the preparation of oxime carbamates having pharmacological activity such as central nervous system and diuretic activity. Certain of the oxime carbamates prepared according to the process of this invention such as isobutyrophenone oxime carbamate are central nervous system depressants and others such as benzyl methyl ketoximecarbamate and dicyclopropylketoxime carbamate are central nervous system stimulants.

According to the process of this invention an alkyl, cycloalkyl (including steroids), aryl, aralkyl, heterocyclic or heterocyclic-alkyl oxime, which may be either a ketoxime or an aldoxime, is reacted with an excess of an alkali metal cyanate, in particular sodium or potassium cyanate, preferably sodium cyanate, and an excess of trifluoroacetic acid. Preferably the oxime is treated with about 2–4 molar equivalents of sodium cyanate and about 2–4 molar equivalents of trifluoroacetic acid. The reaction is carried out at about 15–50° C., preferably at about 25–35° C. or conveniently at room temperature, for about 2–24 hours. To prepaare streospecific oxime carbamates the reaction is preferably allowed to proceed for about 2 to 8 hours. Advantageously the reaction is carried out in an organic solvent which is inert to sodium cyanate and trifluoroacetic acid. Suitable solvents are, for example, ethers such as diethyl ether or tetrahydrofuran, hydrocarbons such as benzene or toluene or halogenated hydrocarbons such as chloroform or methylene dichloride.

The process of this invention is applicable to the preparation of carbamates of oximes generally, the term "oxime" being used herein to denote compounds having a carbon atom to which an oxime grouping is attached and which is further attached to members selected from hydrogen and carbon atoms.

Functional groups such as olefinic or acetylenic linkages; carboxylic acids, esters and amides; ethers; sulfides; tertiary amines; nitro and cyano groups; aldehydes and ketones which may be present on the oxime do not react under the conditions of this process. Hydroxy and mercapto groups when present on the oxime are converted to the carbamate and thiolcarbamate, respectively. Primary and secondary amine groups on the oxime are converted to ureas under the reaction conditions of the process of this invention. The presence of functional groups which are reactive under the conditions of this process does not interfere with the conversion of the oxime group to the oxime carbamate group since an excess of the alkali metal cyanate and an excess of trifluoroacetic acid are used. Advantageously about a two fold excess is used for each reactive group, including the oxime group, present on the oxime compound.

The following examples are not limiting but are illustrative of the method in accordance with this invention. Various changes and modifications may be made in carrying out the process of this invention without departing from the spirit and scope thereof. Insofar as these changes and modifications are within the purview of the appended claims they are considered as part of this invention.

Example 1

A mixture of 11.3 g. of cyclohexanone oxime, 13.0 g. of sodium cyanate, 22.8 g. of trifluoroacetic acid and 150 ml. of methylene dichloride is stirred at 30° C. for 18 hours. A small amount of water is added and the organic layer is separated, dried and the solvent removed in vacuo. The residue is recrystallized from hexane and from water to give cyclohexanone oxime carbamate, M.P. 94–96° C.

Example 2

Trifluoroacetic acid (4.5 g.) is added with stirring to a mixture of dicyclopropylketoxime (2.5 g.) and sodium cyanate (2.6 g.) in 100 ml. of ether. The reaction mixture is stirred for 18 hours at 30° C. The ethereal mixture is neutralized with solid sodium carbonate, filtered and the solvent is removed. On treatment with a small amount of water the oil crystallizes and is recrystallized from methylene chloride-hexane and then from methanol-water to give dicyclopropylketoxime carbamate, M.P. 114–116° C.

Example 3

A mixture of 8.15 g. of syn-isobutyrophenone oxime, 6.5 g. of sodium cyanate, 11.4 g. of trifluoroacetic acid and 100 ml. of methylene dichloride is stirred at room temperature for 3 hours. The reaction mixture is treated with a small amount of water. The organic layer is separated, filtered and concentrated. The residue is recrystallized from cyclohexane to give syn-isobutyrophenone oxime carbamate, M.P. 94–96° C.

Example 4

A mixture of 4.0 g. of anti-isobutyrophenone oxime, 3.3 g. of sodium cyanate, 5.7 g. of trifluoroacetic acid and 75 ml. of methylene dichloride is kept at room temperature for 8 hours. The resulting mixture is filtered and the filtrate is concentrated in vacuo keeping the temperature below 50° C. The residual oil crystallizes. After recrystallizing from a mixture of cyclohexane and hexane, anti-isobutyrophenone oxime carbamate, M.P. 114–116° C., is obtained.

Example 5

A mixture of 10.0 g. of p-chlorobenzaldoxime, 8.35 g. of sodium cyanate, 14.6 g. of trifluoroacetic acid and 200 ml. of methylene dichloride is stirred at room temperature for 16 hours. The reaction mixture is washed with water, dried and concentrated. The residue is recrystallized from benzene to give p-chlorobenzaldoxime carbamate, M.P. 157–158° C.

Example 6

A mixture of 30.0 g. of benzyl methyl ketoxime, 26.0 g. of sodium cyanate, 45.6 g. of trifluoroacetic acid and 250 ml. of methylene dichloride is stirred at 30° C. for 5 hours. The reaction mixture is treated with water and extracted with methylene chloride. The organic layer is dried and concentrated and the residue is chromatographed in ethyl acetate solution using alumina. The crystalline eluates are recrystallized from a mixture of chloroform and hexane to give benzyl methyl ketoxime carbamate, M.P. 87–89° C.

Example 7

Each of the following oximes is stirred at room temperature in methylene dichloride with an excess of sodium cyanate and an excess of trifluoroacetic acid to give, after washing with water, drying, concentrating and recrystallizing the residue, the corresponding oxime carbamate:

benzophenone oxime
3-methyl-2-butanone oxime
pinacolone oxime
1-(2-furyl)-2-butanone oxime
phenylacetaldehyde oxime
2-furaldehyde oxime
2-furyl methyl ketoxime
2-thiophenecarboxaldehyde oxime
2,6-pyridinedicarboxaldehyde dioxime
methyl 2-pyridyl ketoxime
indol-3-yl methyl ketoxime
2-quinolineacetaldehyde oxime
(2-furyl)-2-propanone oxime
2-thienyl p-tolyl ketone oxime
4-pyridyl 2-thiazolyl ketone oxime
2-quinolyl 2-quinolylmethyl ketone oxime
1'-acetonaphthone oxime.

Example 8

A mixture of 13.4 g. of 3-pyridineacetaldehyde oxime (prepared from the hydrochloride salt by dissolving the salt in ethanol, neutralizing with one equivalent of sodium ethoxide in ethanol solution, filtering and concentrating the filtrate), 16.2 g. of potassium cyanate, 22.8 g. of trifluoroacetic acid and 150 ml. of methylene dichloride is stirred at 35° C. for 18 hours. Working up as in Example 1 gives 3-pyridineacetaldehyde oxime carbamate.

What is claimed is:

1. The process of preparing dicyclopropylketoxime carbamate which comprises reacting dicyclopropylketoxime with an excess of alkali metal cyanate and an excess of trifluoroacetic acid in a non-aqueous medium at about 15–50° C.

2. The process of preparing syn-isobutyrophenone oxime carbamate which comprises reacting syn-isobutyrophenone oxime with an excess of sodium cyanate and an excess of trifluoroacetic acid in a non-aqueous medium at about 15–50° C.

3. The process of preparing benzyl methyl ketoxime carbamate which comprises reacting benzyl methyl ketoxime with an excess of alkali metal cyanate and an excess of trifluoroacetic acid in a non-aqueous medium at about 15–50° C.

References Cited

UNITED STATES PATENTS 3,223,733   12/1965   Heiss et al. _____ 260—566

CHARLES B. PARKER, *Primary Examiner.*

R. V. HINES, *Assistant Examiner.*